United States Patent
Haddas et al.

(10) Patent No.: US 12,320,669 B2
(45) Date of Patent: Jun. 3, 2025

(54) METHODS AND SYSTEMS FOR LAND SURVEYING

(71) Applicant: ELI ETKES SONS LTD., Tzofit (IL)

(72) Inventors: Tal Haddas, Tzofit (IL); Dor Yalon, Hod Hasharon (IL)

(73) Assignee: ELI ETKES SONS LTD., Tzofit (IL)

( * ) Notice: Subject to any disclaimer, the term of this patent is extended or adjusted under 35 U.S.C. 154(b) by 410 days.

(21) Appl. No.: 17/922,513

(22) PCT Filed: May 4, 2021

(86) PCT No.: PCT/IL2021/050508
§ 371 (c)(1),
(2) Date: Oct. 31, 2022

(87) PCT Pub. No.: WO2021/224915
PCT Pub. Date: Nov. 11, 2021

(65) Prior Publication Data
US 2023/0194309 A1 Jun. 22, 2023

Related U.S. Application Data

(60) Provisional application No. 63/020,218, filed on May 5, 2020.

(51) Int. Cl.
*G01C 25/00* (2006.01)
*G01C 15/00* (2006.01)

(52) U.S. Cl.
CPC ........... *G01C 25/00* (2013.01); *G01C 15/002* (2013.01)

(58) Field of Classification Search
CPC ............................ G01C 25/00; G01C 15/002
(Continued)

(56) References Cited

U.S. PATENT DOCUMENTS

| | | | |
|---|---|---|---|
| 5,100,229 A | 3/1992 | Lundberg et al. | |
| 6,381,006 B1 * | 4/2002 | Ramstrom | G01C 15/002 356/152.1 |

(Continued)

FOREIGN PATENT DOCUMENTS

| | | |
|---|---|---|
| JP | 2007127665 A | 5/2007 |
| WO | 2010/029439 | 3/2010 |

OTHER PUBLICATIONS

PCT International Search Report for International Application No. PCT/IL2021/050508, mailed Aug. 26, 2021, 3pp.
(Continued)

*Primary Examiner* — George B Bennett
(74) *Attorney, Agent, or Firm* — The Roy Gross Law Firm, LLC; Roy D. Gross

(57) ABSTRACT

Disclosed herein is a computerized method for land surveying. The method includes a calibration stage and a land surveying stage. The calibration stage includes: placing a total station (TS) at an origin; selecting at least three reference positions, each having good satellite reception and being at a line-of-sight from the TS; using an antenna(s) to obtain satellite coordinates of the reference positions; using the TS to obtain coordinates, relative thereto, of the reference positions; determining absolute coordinates of the origin, based on the obtained satellite coordinates and the coordinates relative to the TS. If the absolute coordinates of the origin are not determined to a required precision, repeating the calibration stage taking into account an additional reference position(s). Else, continuing to the land surveying stage, wherein the TS is used to measure coordinates, relative to the TS of locations in a surveyed area, thereby obtaining absolute coordinates of the locations.

20 Claims, 5 Drawing Sheets

(58) Field of Classification Search
USPC .......................................................... 33/228
See application file for complete search history.

(56) References Cited

U.S. PATENT DOCUMENTS

| | | | | |
|---|---|---|---|---|
| 7,646,339 | B2* | 1/2010 | Green | G01C 15/00 |
| | | | | 342/357.29 |
| 9,581,443 | B2* | 2/2017 | Gil | G05D 1/0202 |
| 10,264,221 | B2* | 4/2019 | Kumagai | G01C 15/002 |
| 11,373,381 | B1* | 6/2022 | Kahle | G06T 17/00 |
| 11,592,291 | B2* | 2/2023 | Sasaki | G01C 15/06 |
| 11,859,363 | B2* | 1/2024 | Jaycox | E02D 35/00 |
| 2003/0050077 | A1 | 3/2003 | Takeuchi et al. | |
| 2006/0023203 | A1 | 2/2006 | Gatsios et al. | |
| 2007/0052951 | A1* | 3/2007 | Van Cranenbroeck | ............ |
| | | | | G01C 15/002 |
| | | | | 356/139.02 |
| 2010/0066603 | A1 | 3/2010 | O'Keefe et al. | |
| 2015/0309161 | A1* | 10/2015 | Giunta | G01S 7/4095 |
| | | | | 342/59 |
| 2018/0180416 | A1* | 6/2018 | Edelman | G01C 15/002 |
| 2021/0156119 | A1* | 5/2021 | Kovanen | G01C 15/002 |
| 2024/0151551 | A1* | 5/2024 | Lawver | G01C 21/005 |

OTHER PUBLICATIONS

PCT Written Opinion for International Application No. PCT/IL2021/050508, mailed Aug. 26, 2021, 5pp.

PCT International Preliminary Report on Patentability for International Application No. PCT/IL2021/050508, issued Nov. 8, 2022, 6pp.

Moffitt Francis H et al: "Surveying" In: "Surveying", Jan. 1, 1992 (Jan. 1, 1992), Harpercollins College Div, XP093092982, ISBN: 978-0-06-500059-7 pp. 1-848.

Ferris State University: "surveying calculations courses notes 2005/2006" In: Burtch R.: "SURE 215", Jan. 1, 2006 (Jan. 1, 2006), surveying engineering department, XP093084320, pp. 175-201.

Sharafeldin Mohamed Osman Anas et al: "Accuracy Investigation of Three-Point Resection Methodusing Known Points Distribution in Four-Quadrants", Journal of Marine-Earth Science and Technology, vol. 2, No. 2, Nov. 15, 2021.

* cited by examiner

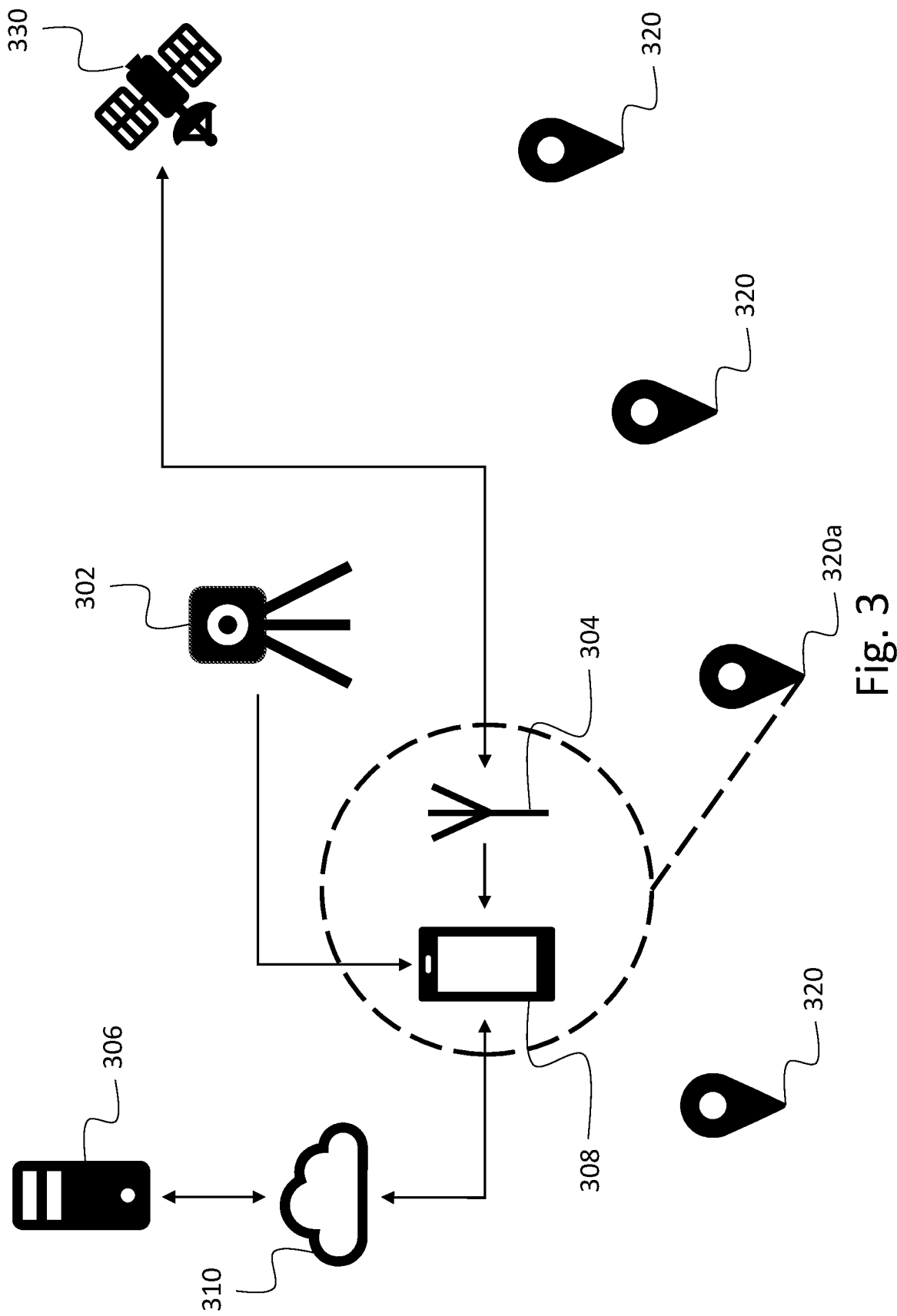

METHODS AND SYSTEMS FOR LAND SURVEYING

CROSS REFERENCE TO RELATED APPLICATIONS

This application is a National Phase of PCT Patent Application No. PCT/IL2021/050508 having International filing date of May 4, 2021, which claims the benefit of priority of U.S. Provisional Patent Application No. 63/020,218, filed May 5, 2020, the contents of which are all incorporated herein by reference in their entirety.

TECHNICAL FIELD

The present disclosure relates generally to methods and systems for land surveying.

BACKGROUND

A total station (TS) is a device used in land surveying (e.g. of a construction site). More specifically, a TS allows determining the distances, as well as the polar and azimuth angles between points in a surveyed area and the TS, thereby allowing to map the surveyed area.

SUMMARY

Aspects of the disclosure, according to some embodiments thereof, relate to land surveying using a total station (TS). More specifically, but not exclusively, aspects of the disclosure, according to some embodiments thereof, relate to methods and systems for land surveying, which integrate TS-obtained data and data from a satellite network to provide increased-accuracy land surveying. In particular, the disclosed methods and systems allow for high-accuracy mapping of a site in terms of a regional coordinate system or a national coordinate system. Advantageously, the integration of data may be performed in real-time (or substantially real-time), such as to enable real-time and on-site increased-accuracy land surveying. Additional advantages include an implementation that is survey marker-free (i.e. survey markers are not necessary) and affords essentially complete freedom in the positioning of the TS.

Thus, according to an aspect of some embodiments, there is provided a computerized method for land surveying. The method includes:

A calibration stage including:
  Selecting an origin and placing a total station (TS) at an origin.
  Selecting at least three reference positions such that each of the reference positions has good satellite reception (a strong and/or stable signal) and is at a line-of-sight from the TS.
  Using at least one antenna to obtain satellite coordinates of each of the reference positions.
  Using the TS to obtain relative coordinates, as defined thereby, of each of the at least three reference positions.
  Determining absolute coordinates of the origin, based on the obtained satellite coordinates and the obtained relative coordinates of the at least three reference positions, and, if the absolute coordinates of the origin are not determined to a required precision, repeating the calibration stage, taking into account at least one additional reference position, else, continuing to:

A land surveying stage, wherein the TS is used to measure relative coordinates of one or more locations in an area to be surveyed, and thereby obtain absolute coordinates of the one or more locations.

According to some embodiments, the at least three reference positions are selected so as to substantially define a polygon.

According to some embodiments, the at least three reference positions consist of three reference positions and the polygon is a triangle.

According to some embodiments, the at least three reference positions are selected such that the polygon, substantially defined thereby, fully includes the area to be surveyed.

According to some embodiments, the at least three reference positions and the origin are selected such that the origin is positioned within the polygon defined by the at least three reference positions.

According to some embodiments, the at least three reference positions, together with the origin, are selected so as to substantially define a polygon.

According to some embodiments, the at least three reference positions and the origin are selected such that the polygon, substantially defined thereby, fully includes the area to be surveyed.

According to some embodiments, the polygon is convex.

According to some embodiments, the polygon is such that any pair of angles thereof differ from one another by about 20%, about 35%, or about 50% at most.

According to some embodiments, the polygon is such that any pair of edges thereof differ from one another in length by about 15%, about 25%, or about 35% at most.

According to some embodiments, the method further includes, as part of the calibration stage, prior to the determination of the coordinates of the origin, checking if each of one or more user-defined conditions are satisfied by the selected at least three reference positions, and, if not, requesting the user to reselect one or more of the at least three reference positions. The user-defined conditions may include the following: (i) any pair of angles of the polygon (defined by the at least three reference positions) being required to differ from one another by no more than a first user-defined limit (e.g. percentage or degrees) and/or (ii) any pair of edges of the polygon being required to differ from one another in length by no more than a second user-defined limit (e.g. percentage or meters).

According to some embodiments, an area of the polygon measures at least about 25 m².

According to some embodiments, in the repeating of the calibration stage (if repetition is necessary), the at least one additional reference position is used instead of an equal number of reference positions from the previously obtained reference positions (so that the determination of the absolute coordinates of the origin is performed based on only three reference positions).

According to some embodiments, the land surveying stage further includes:
  Using the at least one antenna to obtain additional satellite coordinates of (i) at least one of the one or more locations and/or (ii) at least one point within the area, which has good satellite reception, in which case a TS-measurement of the at least one point is also performed.
  Updating the absolute coordinates of the origin, and of the one or more locations in the area, by further taking into account the additional satellite coordinates.

According to some embodiments, the method further includes a graphical representation stage wherein identifying features of at least one of the one or more locations, and the measured coordinates thereof, are used to generate a graphical representation of the area.

According to some embodiments, the graphical representation of the area is updated whenever the absolute coordinates of the origin, and of the one or more locations in the area, are updated.

According to some embodiments, the determining of the absolute coordinates of the origin, in the calibration stage, includes utilizing a resection algorithm.

According to an aspect of some embodiments, there is provided a non-transitory computer-readable storage medium storing instructions that, when executed by a server computer, cause the server computer to:

Compute coordinates (e.g. absolute coordinates) of the origin, upon receipt, from a client, communicatively associated with the computer server, of data including:
coordinates (e.g. satellite coordinates) of at least three reference positions and respective uncertainties thereof, and
relative coordinates of the at least three reference positions with respect to an origin.
The computation of the coordinates of the origin, and uncertainties (or uncertainty, e.g. when computing the square root of the sum of squares of the uncertainties in each of the coordinates) of the coordinates of the origin, is based on the data received from the client.

Transmit the computed coordinates to the client, if the uncertainties in the computed coordinates (of the origin) are smaller or equal to respective pre-defined maximum uncertainties. Else:

Inform the client that the computed coordinates are not determined to the required precision.

According to some embodiments, the coordinates of the origin, and the respective uncertainties thereof, are computed additionally taking into account respective uncertainties of the relative coordinates of the at least three reference positions.

According to some embodiments, the stored instructions further specify a resection algorithm for computing the coordinates of the origin.

According to some embodiments, the stored instructions further specify—upon receipt, from the communicatively associated client, of (i) coordinates of one or more additional positions and/or locations and respective uncertainties thereof and (ii) relative coordinates of the one or more additional positions and/or locations with respect to the origin—computing coordinates of the origin, and uncertainties in the coordinates of the origin, based on the received data pertaining to the at least three reference positions and the one or more additional positions and/or locations.

According to some embodiments, the coordinates of the origin, and the uncertainties thereof, are computed additionally taking into account respective uncertainties in the relative coordinates of the one or more additional positions and/or locations.

According to some embodiments, the received relative coordinates are specified in terms of a spherical coordinate system, and the computed coordinates of the origin are specified in terms of a regional or national coordinate system, or a Cartesian localized coordinate system.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the figures:

FIG. 3 is a block diagram of a land surveying system, according to some embodiments.

DETAILED DESCRIPTION

Figure 1:
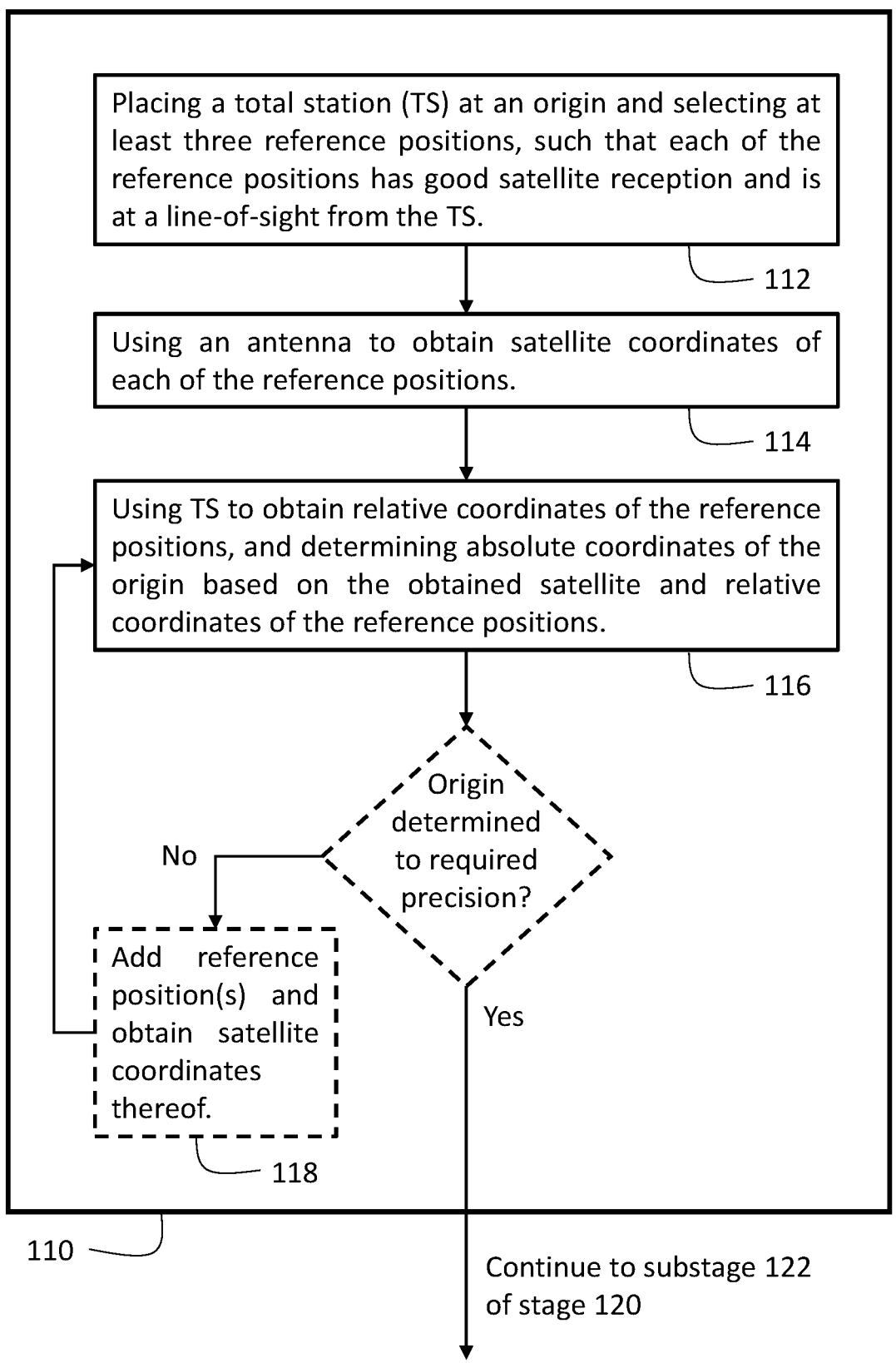
FIG. 1 presents a flowchart of a method for land surveying, according to some embodiments.
Figure 1:
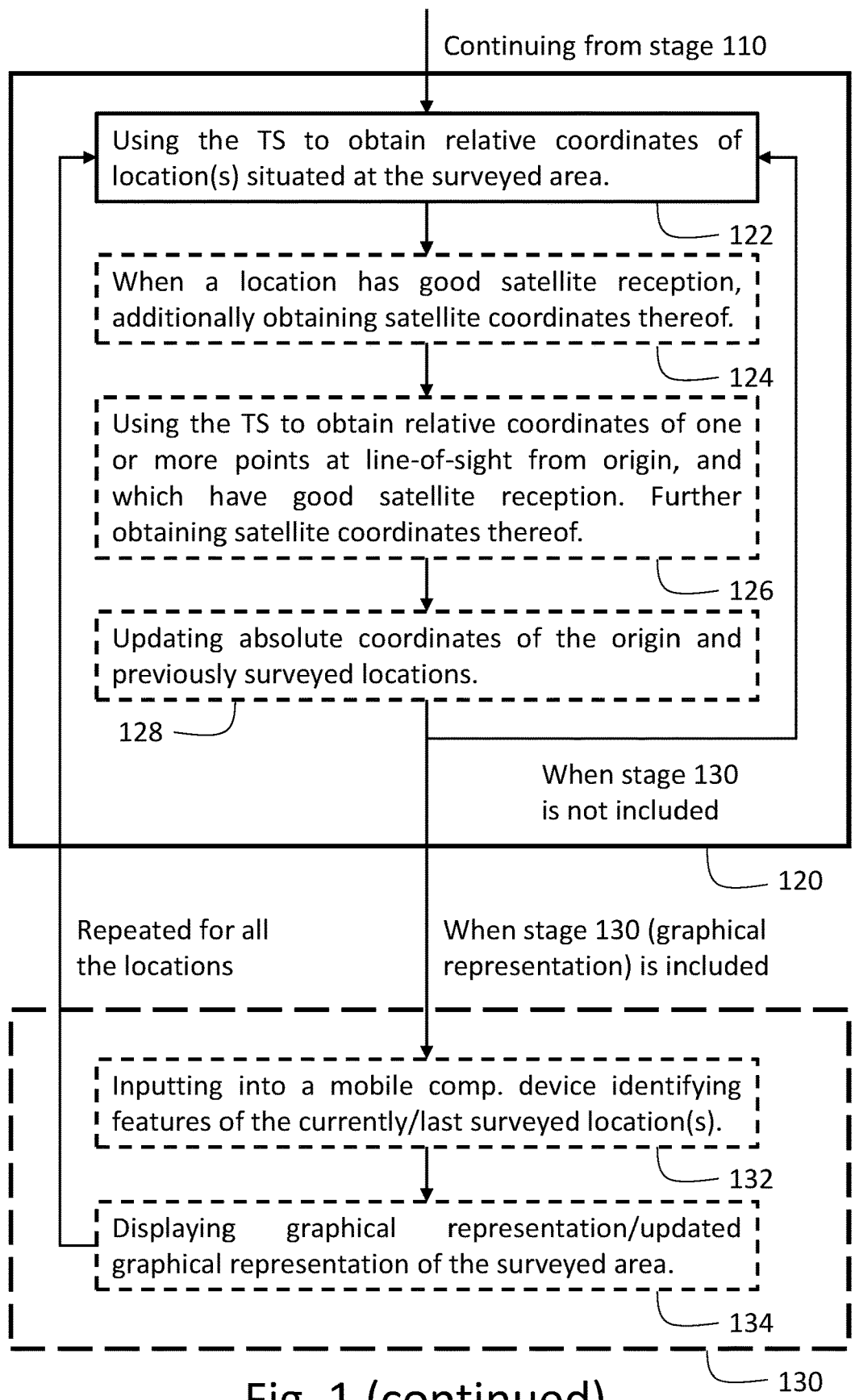

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

Referring to the figures, in flowcharts, optional stages/substages may appear within boxes delineated by a dashed line.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

As used herein, the term "satellite coordinates" may be used to refer to coordinates obtained using a satellite antenna, which measures signals from a plurality of satellites (typically four or more) from a satellite network (e.g. the GPS satellite network). According to some embodiments, satellite coordinates may be specified in terms of a "regional coordinate system" or a "national coordinate system". That is, a coordinate system wherein the x and y axes are obtained by a Mercator (e.g. transverse Mercator) projection, and the z-axis may specify altitude or elevation. Further, as used herein, according to some embodiments, the term "localized coordinate system", with reference to a surveyed area, may be used to refer to a Cartesian coordinate system whose origin is located within or near a surveyed area. In particular, a total station (TS), used to survey the area, may be positioned at the origin.

According to an aspect of some embodiments, there is provided a computerized method 100 for land surveying of an area or site. FIG. 1 presents a flowchart of method 100, according to some embodiments. Method 100 includes a calibration stage 110, a land surveying stage 120, and, optionally, a graphical representation stage 130.

Stage 110 includes a substage 112 wherein a TS is placed at an origin. The origin is selected such as to allow surveying of an area using the TS. In particular, the origin may be selected to afford the TS a complete, or at least a near complete, view of the area, such that that the area may be surveyed in full.

Stage 110 further includes a substage 114, wherein satellite coordinates of at least three reference positions are obtained by positioning a satellite antenna(s) at each of the reference positions. Each reference position is selected to be at a respective line-of-sight from the origin. Further, the reference positions are selected such as to have good satellite reception (in the sense of allowing for determining coordinates thereof using a satellite network such as a global positioning system (GPS) and, more generally, a global navigation satellite system (GNSS)).

Stage 110 further includes a substage 116 wherein the coordinates of the origin are determined based on the obtained satellite coordinates of the reference positions. More specifically, a retroreflector (e.g. a prism) may be temporarily mounted at each of the reference positions (which, as already mentioned, are each at a respective line-of-sight from the origin). The relative coordinates of the reference positions, as defined by the origin (i.e. the coordinates of the reference positions according to a coordinate system wherein the TS is located at the origin of the coordinate system), are obtained by TS-measurements. The absolute coordinates (i.e. according to a regional coordinate system or a national coordinate system) of the TS may then be derived from the satellite coordinates of the reference positions, and the obtained relative coordinates of the reference positions, by resection (e.g. using a triangulateration algorithm).

According to some embodiments, substage 116 further includes computing uncertainties associated with each of the computed coordinates. In such embodiments, the land surveying stage may be initiated (i.e. stage 120 may be initiated) contingent on the (absolute) coordinates of the origin having been derived to within a required precision. Otherwise, if the coordinates of the origin have not been determined to within the required precision, then a substage 118 is implemented, wherein at least one additional reference position is selected and the satellite coordinates thereof are obtained. (Each of the at least one additional reference position is also selected such as to be at a line-of-sight from the origin and to have good satellite reception.) Substage 116 is repeated, additionally taking into account the at least one additional reference position. If the required precision is still not attained, substage 118 and substage 116, are repeated until the required precision is attained.

According to some embodiments, the at least one additional reference position is used instead of a same number of previously selected reference positions. Thus, when the at least one additional reference position is a single reference position, the additional reference position replaces one of the previously selected reference positions (i.e. is taken into account in its stead) in the computation of the absolute coordinates of the origin. In particular, in such embodiments, the determination of the absolute coordinates of the origin—in any repetition of substage 116—is performed based on only three reference positions.

As used herein, according to some embodiments, coordinates of a position/location/point are said to be determined to within a "required precision" when (i) the uncertainties in each of the coordinates is smaller than respective pre-defined maximum uncertainties, or at least (ii) the uncertainty associated with the coordinates (e.g. the square root of the sum of squares of the uncertainties in each of the coordinates, or even a weighted sum of squares assigning different pre-defined weights to different coordinates, or the maximum uncertainty with the maximum taken over the uncertainties of each the three coordinates, wherein, optionally, some of the coordinates may be assigned respective pre-defined factors), is smaller than a pre-defined maximum uncertainty. In particular, according to some embodiments, the precision to which the z-coordinate (i.e. the coordinate measuring the elevation) has to be determined may be greater than the precision to which the rest of the coordinates have to be determined.

It is noted that, according to some embodiments, the coordinates of the reference positions may additionally, or alternatively, be specified by a geodesic control network.

According to some embodiments, the reference positions may be selected such as to substantially define a non-degenerate polygon. According to some such embodiments, the reference positions may be selected such that the polygon, defined thereby, is convex. As used herein, a plurality of coordinates may be said to "substantially define a polygon" when—discounting any differences in elevation between the coordinates—the coordinates define a polygon. Thus, for example, when the reference positions consist of three reference positions, the reference positions constitute the vertices of a triangle. As another example, when the reference positions consist of four reference positions, the reference positions may substantially constitute the vertices of a quadrangle.

According to some embodiments, the reference positions are selected to substantially define a polygon such that any pair of angles of the polygon differ from one another by about 20%, about 35%, or about 50% at most. Each possibility corresponds to separate embodiments. Additionally, or alternatively, according to some embodiments, the reference positions are selected to substantially define a polygon such that any pair of edges (sides) of the polygon differ from one another in length by about 15%, about 25%, or about 35% at most. Each possibility corresponds to separate embodiments. Substantially uniform spreading (i.e. substantially even distribution) of the reference positions may potentially help ensure greater precision in the determination of the coordinates of the origin.

According to some embodiments, the maximum difference between angles of the polygon (whether specified in terms of percentage or degrees), and/or the maximum difference in length between edges of the polygon (whether specified in terms of percentage or meters), may depend on the number reference positions (or, put differently, the number of vertices of the of the polygon).

According to some embodiments, the maximum difference between angles of the polygon (whether specified in terms of percentage or degrees), and/or the maximum difference in length between edges of the polygon (whether specified in terms of percentage or degrees), may be set by the user.

It is noted that the area of the polygon may provide an indication of the quality of the selection of the reference positions. In particular, a too small an area may not allow for sufficiently high precision in the determination of the coordinates of the origin. Thus, according to some embodiments, the reference positions are selected such that the polygon (defined thereby) has an area of at least about 25 m$^2$, about 35 m$^2$, or about 50 m$^2$. Each possibility corresponds to separate embodiments. According to some such embodiments, wherein the reference positions number three, so that the polygon defined thereby is a triangle, the reference positions are selected such that polygon has an area of at least about 50 m$^2$, so as to likely ensure that the origin is determined to a precision of at least about, for example, about 1 cm, or even about 0.5 cm (the precision may primarily be limited by the precision of the GPS measurements since a TS may measure to a precision of about 1 mm).

Figure 2A:
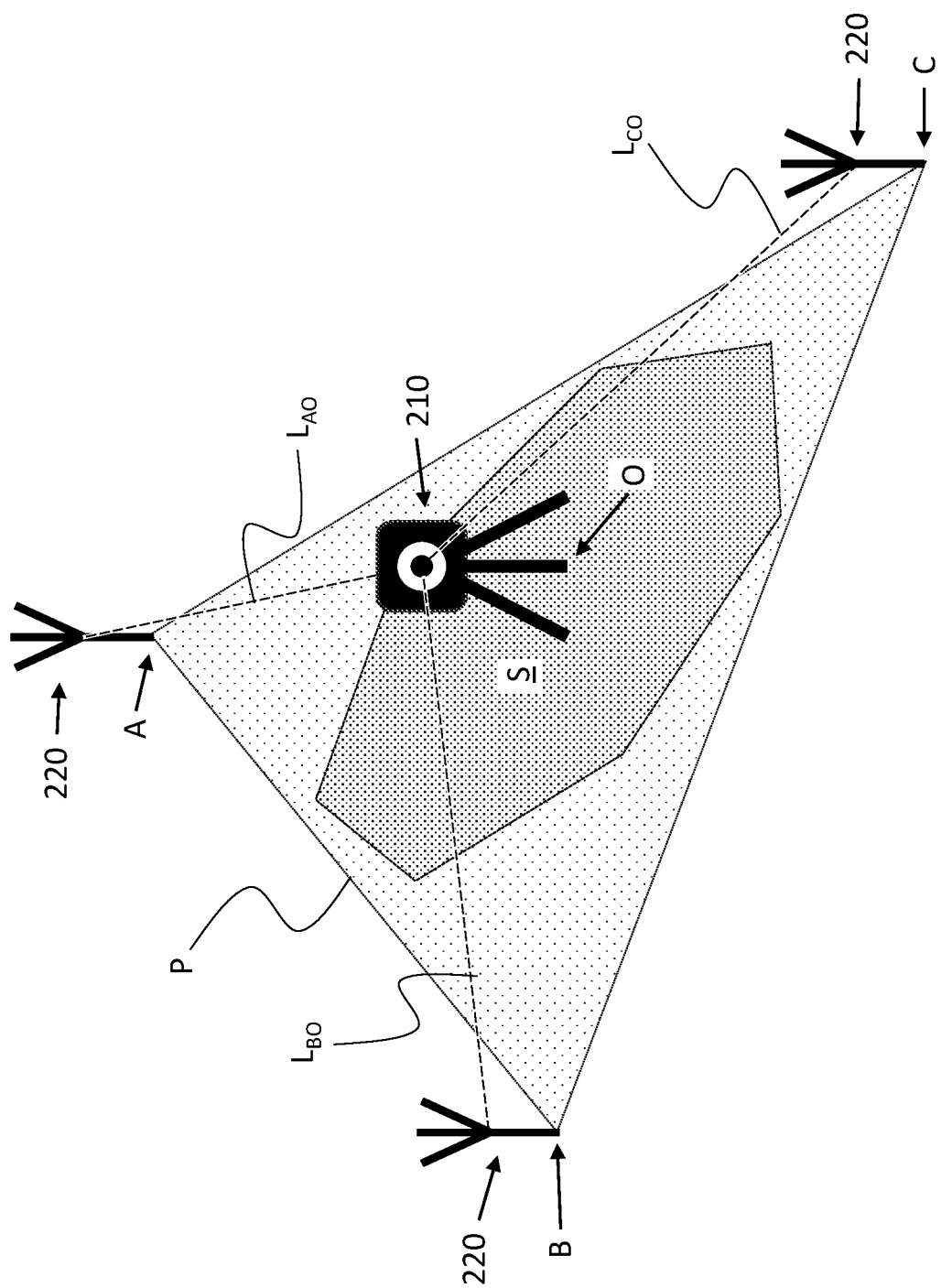
FIG. 2A schematically depicts determination of coordinates of a total-station, using an antenna(s) and the total station, according to some embodiments.

According to some embodiments, as depicted for example in FIG. 2A, the reference positions may be selected such that the TS is positioned within the polygon defined by the reference positions. According to some embodiments, the TS may be positioned within the area to be surveyed. According to some such embodiments, the reference positions may be selected such that the area is fully included within the polygon substantially defined by the reference positions. According to some embodiments, the inclusion of the area within the polygon may help ensure that the area is substantially mapped to the precision to which the coordinates of the origin have been determined. That is, the uncertainty/uncertainties in the obtained coordinates of each point in the area is substantially equal to, or smaller than, the uncertainty/uncertainties in the coordinates of the origin.

Figure 2B:
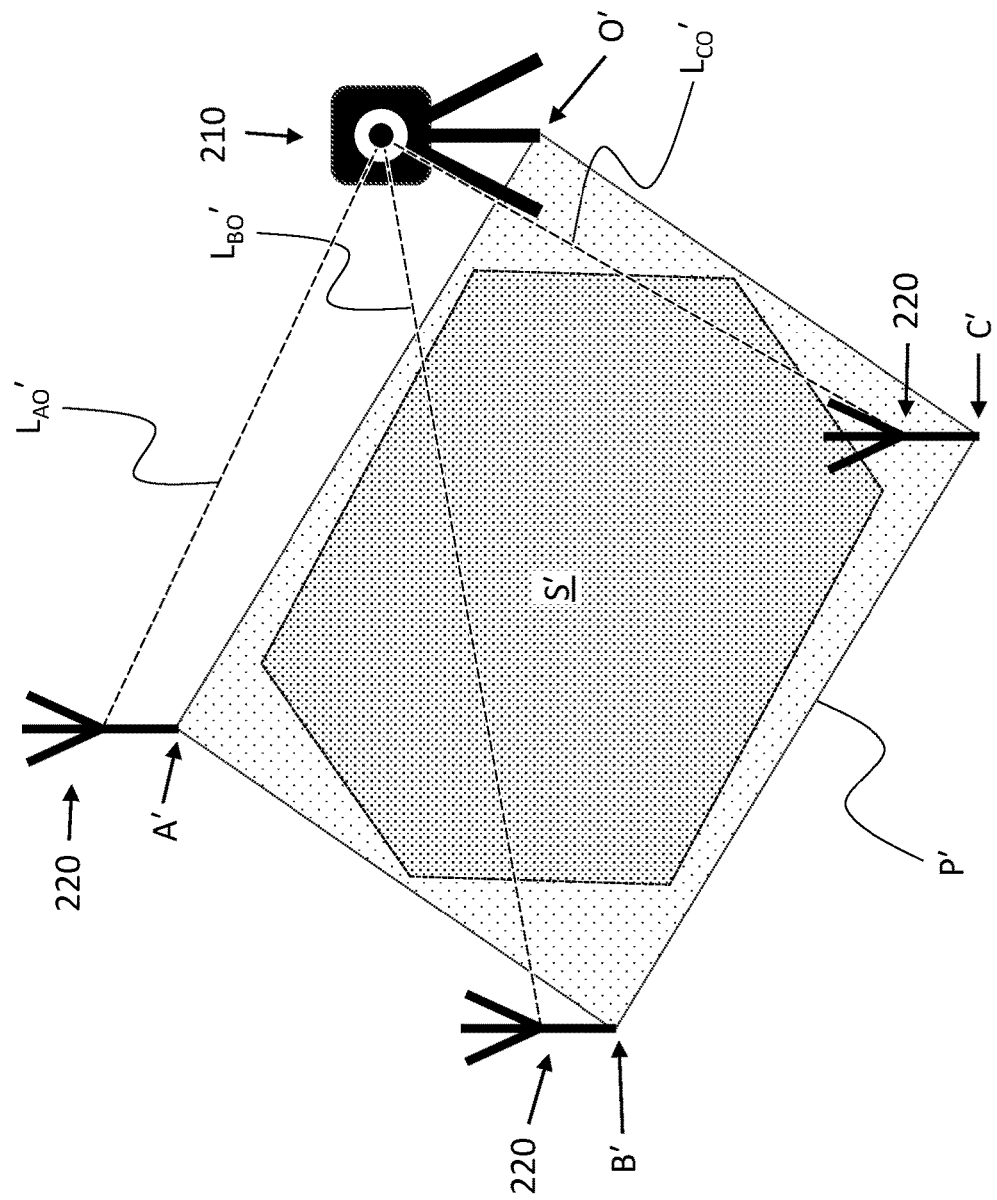
FIG. 2B schematically depicts determination of coordinates of a total-station, using an antenna(s) and the total station, according to some embodiments.

According to some embodiments, as depicted for example in FIG. 2B, the reference positions, together with the origin, may be selected such as to substantially define a non-degenerate polygon. According to some such embodiments, the reference positions may be selected such that the polygon, defined by the reference positions and the origin, is convex. According to some embodiments, the reference positions may be selected such that the area to be surveyed is fully included within polygon substantially defined by the reference positions and the origin. According to some embodiments, the inclusion of the area within the polygon may help ensure that the area is mapped at least to the precision to which the coordinates of the origin have been determined.

FIG. 2A schematically depicts an origin O and three reference positions A, B, and C. Each of reference positions A, B, and C, and origin O, may be positioned in the area (to be surveyed) or near the area. A TS 210 is shown positioned at origin O. Also indicated is an antenna 220, which is placed first at reference position A, and used to obtain the satellite coordinates thereof, next at reference position B, and used to obtain the satellite coordinates thereof, and finally at reference position C, and used to obtain the satellite coordinates thereof. Each of reference positions A, B, and C is positioned at a (respective) line-of-sight from origin O, as indicated by the dashed double-headed arrows ($L_{AO}$, $L_{BO}$, and $L_{CO}$, respectively), such as to allow obtaining the relative coordinates thereof (using TS 210) with respect to origin O. (Alternatively, according to some embodiments, three different antennas—positioned at each of reference positions A, B, and C, respectively—may be employed.)

Reference positions A, B, and C define a triangle P. According to some embodiments, and as depicted in FIG. 2A, the reference positions may be selected such that origin O (i.e. TS 210) is positioned within triangle P. Also indicated in FIG. 2A is an area S that is to be surveyed. According to some embodiments, and as depicted in FIG. 2A, origin O may be selected to be positioned within area S. According to some embodiments, and as depicted in FIG. 2A, the reference positions may be selected such that area S is fully included within triangle P.

Stage 120 includes a substage 122, wherein TS-coordinates of locations in the area may be obtained using TS 210 (and a retroreflector). The locations may be selected on-site by the user (the land surveyor), e.g. according to the principles of the art of land surveying. As used herein, the term "TS-coordinates" of a location/position/point refers to coordinates generated based on TS-measurements and the computed coordinates of the origin (obtained in stage 110): The TS-measurements are used to obtain the relative coordinates with respect to the origin, which may then be made "absolute", for example, by adding the relative position (when expressed as a vector) to a vector specifying the determined coordinates (computed in stage 110) of the origin.

FIG. 2B schematically depicts an origin O' and three reference positions A', B', and C' selected in accordance with stage 110 of method 100, according to some embodiments thereof. In FIG. 2B reference positions A', B', and C' (at which antenna 220 is successively positioned), and origin O' (at which TS 210 is positioned) are selected such as to define a quadrangle P' that includes the area to be surveyed (indicated as S'). Also indicated in FIG. 2B—by dashed double-headed arrows $L_{AO}'$, $L_{BO}'$, and $L_{CO}'$—are lines-of-sight from reference positions A', B', and C' to origin O, respectively.

According to some embodiments, TS-coordinates may be additionally, or alternatively, be presented in terms of a localized (Cartesian) coordinate system, wherein the origin is assigned the coordinates (0, 0, 0) (rather than the coordinates thereof in terms of a regional or national coordinate system).

Optionally, stage 120 may further include a substage 124, wherein, when one of the locations of substage 122 has good satellite reception, the satellite coordinates thereof are also obtained.

Additionally, or alternatively, to substage 124, and as elaborated on below in the description of FIG. 3, stage 120 may include a substage 126 wherein satellite coordinates of one or more points in the area (in addition to the locations of substage 122), may be obtained, as well as relative coordinates thereof (obtained using the TS).

In embodiments of stage 120 including substage 124 and/or substage 126, stage 120 may further include a substage 128, wherein, the acquired satellite coordinates and relative coordinates (obtained by the TS) of an additional location or a point, respectively, may be used to update (i.e. correct and compute to a higher accuracy) the (absolute) coordinates of the origin (essentially, as described in the description of substage 116). Following which, the (absolute) coordinates of previously surveyed locations may also be updated. The updating may be performed in real-time or in near real-time, as elaborated on below.

Stage 130 may be implemented using a mobile computation device, e.g. a smartphone or a tablet. The mobile computation device may include (i) a user control interface, allowing the user to input information characterizing a location (identifying features of the location), as well as (ii) a screen.

Stage 130 may include a substage 132 wherein identifying features associated with one or more of the locations (of substage 122), respectively, are input into the mobile computation device. For example, the user may specify the type of object present at a location (whose relative coordinates were obtained in substage 122), e.g. a wall, a tree, a beam, a column, a corner.

Stage 130 may further include a substage 134 wherein a graphical representation of the topography of the surveyed area is displayed, e.g. on the screen. The graphical representation may be generated based on position data (i.e. the computed TS-coordinates) of the one or more of the locations and the identifying features thereof. According to some embodiments, stage 130 may be performed simultaneously or substantially simultaneously to stage 120, such that the graphical representation may be updated in real-time or near real-time.

Method 100 may be implemented using a (land) surveying system 300. FIG. 3 presents a block diagram of a land surveying system, according to some embodiments. Land surveying system 300 includes a TS 302, at least one antenna 304, a server computer 306 (e.g. an online server), and a mobile computation device 308 (e.g. a smartphone, a tablet, a portable computer). Mobile computation device 308 is communicatively associated with server computer 306 via a communication network 310 (e.g. via the Internet). That is, mobile computation device 308 is a "client" of server computer 306. According to some embodiments, antenna 304 may be a GNSS antenna.

TS 302 may be communicatively associated with mobile computation device 308, for example, via Bluetooth or Wi-Fi. In such embodiments, TS 302 may be equipped with a Bluetooth antenna and/or a Wi-Fi antenna. (It is noted that class 1 Bluetooth systems have a range of up to 100 m). Additionally, or alternatively, TS 302 may be equipped with a cellular antenna. According to some such embodiments, TS 302 may be configured to directly relay data to server computer 306 (instead of indirectly relaying the data to server computer 306 via mobile computation device 308).

Mobile computation device 308 may be communicatively associated with antenna 304, such as to allow receiving measurement results (i.e. obtained satellite coordinates) of antenna 304.

Server computer 306 may include at least one processor and at least one memory functionally associated with the processor. The memory may include non-volatile memory components having stored therein software instructions executable by the processor, which are described below. Similarly, mobile computation device 308 may include at least one processor and at least one memory functionally associated with the processor. The memory may include non-volatile memory components having stored therein software instructions executable by the processor, which are described below. Also indicated are locations 320 (e.g. the locations of stage 120), which are each at a line-of-sight from the origin and at which TS-measurements are performed. A location 320a (from locations 320) further has good satellite reception.

Referring also to FIG. 1, in substage 112, TS 302 may be positioned at the origin. Substage 114 may be performed e.g. using antenna 304, which may be successively positioned at each of the reference positions. The satellite coordinates of each of the reference positions are obtained using satellites 330. The satellite coordinates may be transmitted via mobile computation device 308 to server computer 306.

Substage 116 may be performed by positioning retroreflector(s) (not shown) at each of the reference positions (not shown in FIG. 3) at a (respective) line-of-sight from TS 302. TS 302 determines the relative coordinates of each of the reference positions in relation thereto (i.e. the origin), and, according to some embodiments, transmits the determined relative coordinates to mobile computation device 308, which in turn relays them to server computer 306. Server computer 306 is configured to determine the (absolute) coordinates of TS 302 (and thereby the absolute coordinates of the origin), based on the satellite coordinates of the reference positions and the determined relative coordinates of the reference positions. According to some embodiments, server computer 306 may be configured to utilize a resection algorithm (e.g. a triangulateration algorithm) to determine the absolute coordinates of the origin.

Server computer 306 may be further configured to compute the uncertainties associated with the determined absolute coordinates of the origin (i.e. the precision to which the absolute coordinates of the origin may be determined given the uncertainties in the obtained satellite coordinates of the reference positions, and, optionally, the TS-obtained relative coordinates of the reference positions). Server computer 306 may be further configured to send the determined absolute coordinates of the origin and the uncertainties associated therewith to mobile computation device 308. Based on the uncertainties, the user may decide whether to proceed to stage 120 or whether to obtain satellite coordinates of additional reference positions and repeat stage 116.

According to some embodiments, prior to stage 116, the user may input into mobile computation device 308 the required precision (to which the absolute coordinates of the origin are to be determined). Mobile computation device 308 then transmits the required precision to server computer 306. In such embodiments, server computer 306 may be configured to check whether the uncertainty or uncertainties associated with determined (absolute) coordinates of the origin (computed thereby) is or are sufficiently small (i.e. meets the required precision), and to report the result to mobile computation device 308.

It is noted that the obtained satellite coordinates of the reference positions may be specified according to a regional or national coordinate system (wherein the z coordinate may correspond to the altitude or the elevation), while TS 302 may specify the relative coordinates of the reference positions in spherical coordinates. According to some embodiments, server computer 306 may be configured to specify the coordinates of the origin in a (Cartesian) localized coordinates system.

According to some embodiments, mobile computation device 308 (or server computer 306) may be configured to (e.g. as part of substage 114) compute an area of a polygon (e.g. triangle P of FIG. 2A) that is substantially defined by the reference positions. According to some such embodiments, if the area is smaller than a minimum area, mobile computation device 308 may be further configured to request the user to reselect one or more of the reference positions. According to some such embodiments, the minimum area measures about 25 m$^2$, about 35 m$^2$, or about 50 m$^2$. Each possibility corresponds to separate embodiments.

According to some embodiments, mobile computation device 308 (or server computer 306) may be configured to (e.g. as part of substage 114) compute the angles of the polygon (e.g. triangle P of FIG. 2A or quadrangle P' of FIG. 2B), substantially defined by the reference positions, and, optionally the origin, and, if a difference between any pair of angles is greater than a maximum difference, request the user to reselect one or more of the reference positions or, optionally, even the origin. According to some embodiments, mobile computation device 308 may be configured to allow the user to set the maximum difference.

According to some embodiments, mobile computation device 308 (or server computer 306) may be configured to (e.g. as part of substage 114) compute the lengths of the edges of the polygon (substantially defined by the reference positions, and, optionally, the origin), and, if a difference between the lengths of any pair of edges is greater than a maximum difference, request the user to reselect one or more of the reference positions, or, optionally, even the origin. According to some embodiments, mobile computation device 308 may be configured to allow the user to set the maximum difference.

TS 302 may be used to implement the TS-measurements of substage 122. Antenna 304 may be used in implementing substage 124, e.g. to obtain satellite coordinates of locations from locations 320, such as location 320a, which are characterized by good satellite reception.

According to some embodiments, as the user (land surveyor) walks through the surveyed area, for example, from one of locations 320 to another of locations 320, they may pass through a point having good satellite reception and which is at a line-of-sight from TS 302. According to some embodiments, mobile computation device 308 may be configured to suggest to the user to stop, in order to allow for the satellite coordinates of the point to be obtained and for a TS-measurement to be performed (thereby implementing substage 126).

Mobile computation device 308 may be configured to send data obtained in substages 122, 124, and, optionally, substage 126 to server computer 306. Server computer 306 may be configured to process the data received (together with earlier data corresponding to the reference positions) to determine the coordinates of the origin to higher precision (which will typically include a slight displacement (i.e. correction of the absolute coordinates) of the origin) and accordingly correct the computed (absolute) coordinates of previously surveyed locations from locations 320, essentially as described in the description of substage 128.

Substages 132 and 134 of method 100 may be performed using mobile computation device 308, based on inputs of the user and data (computed absolute coordinates) received from server computer 306. In particular, mobile computation device 308 may include a screen on which the graphical representation of the surveyed area may be displayed.

According to some alternative embodiments, some of the computations described above as implementable by server computer 306, are additionally or alternatively implementable by mobile computation device 308. According to some embodiments, all the computations described above as implementable by server computer 306, are additionally or alternatively implementable by mobile computation device 308. It is noted that when all of the computations are implementable by mobile computation device 308, server computer 306 is unnecessary, as is cellular reception (to connect to communication network 310).

According to some embodiments, antenna 304 may be included in the mobile computation device 308.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A computerized method for land surveying, the method comprising:
   a calibration stage comprising:
      selecting an origin and placing a total station (TS) thereat;
      selecting at least three reference positions such that each of the reference positions has good satellite reception and is at a line-of-sight from the TS;
      using at least one antenna to obtain satellite coordinates of each of the reference positions;
      using the TS to obtain relative coordinates, as defined thereby, of each of the at least three reference positions; and
      determining absolute coordinates of the origin, based on the obtained satellite coordinates and the obtained relative coordinates of the at least three reference positions, and, if the absolute coordinates of the origin are not determined to a required precision, repeating the calibration stage taking into account at least one additional reference position, else, continuing to:
   a land surveying stage, wherein the TS is used to measure relative coordinates of one or more locations in an area to be surveyed, and thereby obtain absolute coordinates of the one or more locations.

2. The method of claim 1, wherein the at least three reference positions are selected so as to substantially define a polygon.

3. The method of claim 2, wherein the at least three reference positions consist of three reference positions and the polygon is a triangle.

4. The method of claim 2, wherein the at least three reference positions are selected such that the polygon fully includes the area to be surveyed.

5. The method of claim 1, wherein the at least three reference positions and the origin are selected such that the origin is positioned within the polygon.

6. The method of claim 1, wherein the at least three reference positions, together with the origin, are selected so as to substantially define a polygon.

7. The method of claim 2, wherein the polygon is convex.

8. The method of claim 2, wherein the polygon is such that any pair of angles thereof differ from one another by about 20%, about 35%, or about 50% at most; and/or wherein the polygon is such that any pair of edges thereof differ from one another in length by about 15%, about 25%, or about 35% at most.

9. The method of claim 2, further comprising, as part of the calibration stage, prior to the determination of the coordinates of the origin, checking if each of one or more user-defined conditions are satisfied by the selected at least three reference positions, and, if not, requesting the user to reselect one or more of the at least three reference positions;
   wherein the user-defined conditions comprise at least one of: (i) any pair of angles of the polygon differ from one another by no more than a first user-defined limit, and (ii) any pair of edges of the polygon differ from one another in length by no more than a second user-defined limit.

10. The method of claim 2, wherein an area of the polygon measures at least about 25 $m^2$.

11. The method of claim 1, wherein the land surveying stage further comprises:
   using the at least one antenna to obtain additional satellite coordinates of (i) at least one of the one or more locations and/or (ii) at least one point within the area, which has good satellite reception, in which case a TS-measurement of the at least one point is also performed; and
   updating the absolute coordinates of the origin, and of the one or more locations in the area, by further taking into account the additional satellite coordinates.

12. The method of claim 1, further comprising a graphical representation stage wherein identifying features of at least one of the one or more locations, and the measured coordinates thereof, are used to generate a graphical representation of the area; and
   wherein the graphical representation of the area is updated whenever the absolute coordinates of the origin, and the one or more locations in the area, are updated.

13. The method of claim 1, wherein the determining of the absolute coordinates of the origin, in the calibration stage, comprises utilizing a resection algorithm.

14. The method of claim 1, wherein, in repeating of the calibration stage, the at least one additional reference position is used instead of an equal number of reference positions from the previously obtained reference positions.

15. A non-transitory computer-readable storage medium storing instructions that, when executed by a server computer, cause the server computer to:
   upon receipt, from a communicatively associated client, of (i) coordinates of at least three reference positions and respective uncertainties thereof, and (ii) relative coordinates of the at least three reference positions with respect to an origin, compute coordinates of the origin, and uncertainties in the coordinates of the origin, based on the received data from the client; and
   if the uncertainties in the computed coordinates are smaller or equal to respective pre-defined maximum uncertainties, transmit the computed coordinates to the client, else inform the client that the computed coordinates are not determined to the required precision.

16. The storage medium of claim 15, wherein the coordinates of the origin, and the respective uncertainties thereof, are computed additionally taking into account respective uncertainties of the relative coordinates of the at least three reference positions.

17. The storage medium of claim 15, wherein the stored instructions comprise a resection algorithm for computing the coordinates of the origin.

18. The storage medium of claim 15, wherein the stored instructions further comprise, upon receipt, from the communicatively associated client, of (i) coordinates of one or more additional positions and/or locations and respective uncertainties thereof, and (ii) relative coordinates of the one or more additional positions/locations with respect to the origin, computing coordinates of the origin, and uncertainties thereof, based on the received data pertaining to the at least three reference positions and the one or more additional positions and/or locations.

19. The storage medium of claim 18, wherein the coordinates of the origin, and the uncertainties thereof, are computed additionally taking into account respective uncertainties of the relative coordinates of the one or more additional positions/locations.

20. The storage medium of claim 15, wherein the received relative coordinates are specified in terms of a spherical coordinate system, and wherein the computed coordinates of the origin are specified in terms of a regional or national coordinate system, or a Cartesian localized coordinate system.

\* \* \* \* \*